(12) United States Patent
Ramaley et al.

(10) Patent No.: US 6,585,777 B1
(45) Date of Patent: Jul. 1, 2003

(54) METHOD FOR MANAGING EMBEDDED FILES FOR A DOCUMENT SAVED IN HTML FORMAT

(75) Inventors: Alan A. Ramaley, Seattle, WA (US); Darrell L. Aldrich, Redmond, WA (US); David M. Buchthal, Duvall, WA (US); Thomas W. Olsen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/233,991

(22) Filed: Jan. 19, 1999

(51) Int. Cl.[7] .............................................. G06F 15/00
(52) U.S. Cl. ..................... 715/513; 715/513; 715/501.1; 707/100
(58) Field of Search ................................. 707/513, 100, 707/501, 106, 511; 715/513, 501.1, 500, 511

(56) References Cited

U.S. PATENT DOCUMENTS

| | | | | | |
|---|---|---|---|---|---|
| 5,809,250 | A | * | 9/1998 | Kisor ........................ | 709/224 |
| 6,101,509 | A | * | 8/2000 | Hanson et al. .............. | 707/513 |
| 6,163,779 | A | * | 12/2000 | Mantha et al. .............. | 707/100 |
| 6,182,092 | B1 | * | 1/2001 | Francis et al. .............. | 707/513 |
| 6,199,071 | B1 | * | 3/2001 | Nielsen ...................... | 707/204 |

OTHER PUBLICATIONS

Musciano et al., "HTML The Definitive Guide", Coppyright 1998 O'Reilly & Associates, Inc., pp. 52, 261, 274, 275, 413, 414.*

Mathews et al., "Vector Markup Language (VML)", Word Wide Web Consortium Note May 13, 1998, pp. 1–49.*

* cited by examiner

*Primary Examiner*—Stephen S. Hong
*Assistant Examiner*—Thu V. Huynh
(74) *Attorney, Agent, or Firm*—Merchant & Gould

(57) ABSTRACT

A computer-implemented process for simulating, in an HTML-formatted primary file, certain user-expected characteristics of an electronic document containing an embedded file. In response to initiating a save operation for a primary file to be saved as an HTML document, a file embedded within the primary file is detected. In turn, a support file is created for storage, in a separate storage location and physically removed from the primary file, to logically represent the embedded file. In addition, a current file list, which is associated with the primary file, is created and saved to the storage mechanism, typically the hard disk drive for the computer. When the HTML-formatted primary file is opened in a work session, the editor can open a link to each support file identified by the file list. In response to conducting a save operation for a primary file, an inquiry can be conducted to determine if a prior file list is associated with the primary document. If a prior file list is located, then the current file list is compared to the prior file list. This comparison operation is completed to determine whether support files identified by the prior file list are no longer identified by the current file list. The support files not identified by the current file list, but identified in the prior file list, are deleted from the hard disk of the computer because the corresponding embedded files have been deleted by edit operations for the primary file.

19 Claims, 7 Drawing Sheets

METHOD FOR MANAGING EMBEDDED FILES FOR A DOCUMENT SAVED IN HTML FORMAT

FIELD OF THE INVENTION

This invention relates in general to managing an embedded file within an electronic document, and more specifically relates to simulating the characteristics of a file embedded within a primary file in response to saving the primary file in an Hyper Text Mark-up Language (HTML) format.

BACKGROUND OF THE INVENTION

Users have clear expectations of how embedded content management should work. These expectations have been established from years of using traditional desktop productivity tools, such as word processing programs, which typically enable both embedding content in a primary document and editing the embedded content. In contrast, for Hyper Text Mark-up Language (HTML)-formatted documents, such as web pages, each piece of content is required to be a separate linked file. In other words, HTML does not directly support the concept of embedding content in the primary document. Nevertheless, the expectations of users have not changed in this HTML-formatted document environment because they still desire HTML documents to support the characteristics of embedded content.

Referring to FIG. 1, when a user saves an electronic document as a typical word processing file, such as a Microsoft "WORD 97" program file shown in a display 100, both a sunburst image 102 and a background image 104 are physically contained in the file as "embedded" files. In contrast, a linked logo 106 and a hyperlink to another web page 108 remains outside of the file as "linked" items. Users experienced with traditional desktop productivity applications have certain expectations in the characteristics exhibited by embedded content within an electronic document, such as the content presented by the display 100. For example, users typically expect the following representative results, shown in Table I, in response to manipulating a electronic file containing an embedded file or operating directly upon an embedded file.

TABLE I (a) deleting embedded content should remove the embedded content from the file system.
(b) changing embedded content in one copy of a document should not change this content in other copies of the document.
(c) saving a copy of a document with embedded content should operate to also copy the embedded content.
(d) saving a document over an existing document should delete embedded content in the existing document.
(e) adding new embedded content to a document should not result in an unexpected overwrite of existing content in the document.
(f) saving a document containing embedded content should not result in a prompt for a user to save the embedded content.

However, when the electronic document of FIG. 1 is saved as an HTML-formatted web page, the sunburst image 102 and the background image 104 can not be physically embedded within the electronic document because of the inherent limitations of the HTML file format. Although the user may believe that the sunburst and the background images 102 and 104 are embedded images, the act of saving the document as an HTML file results in linking these images as separate files to the document. Consequently, prior HTML-compatible editors fail to satisfy the above-referenced expectations of typical users for the performance of embedded files in electronic documents. By linking files, rather than physically embedding files, as a consequence of the HTML format, a user's editing operations may result in the undesirable problem of multiple "orphaned" files that waste disk space and cause general user confusion.

Although the prior art has attempted to solve the problem of managing embedded content in several different ways, each prior solution suffers from key limitations. One prior solution is to present a dialog in response to conducting an HTML save operation, thereby prompting users to select the names and storage locations of each embedded piece of content, while internally converting this content to linked content. For the example of a web page "Web Page.htm" having three different pasted pictures, upon initiating a save operation, the user is typically presented by this prior solution with a dialog prompting the user to select file names for the pictures and storage locations.

This prior solution fails to satisfy user expectations regarding the behavior of the pasted pictures because, after the first save within the HTML format, the pasted pictures become separate linked files. For example, deleting a link does not result in the removal of the linked content from the file system. A change to the linked content in one copy of a document can result in the unintended change of this linked content in other copies of the document. In contrast to a save operation of an electronic document having embedded content, saving a copy of a document with linked content does not result in saving a copy of the linked content. Likewise, saving a document over an existing document does not result in the deletion of linked content in the existing document. Adding new linked content to a document can result in an unexpectedly overwrite of existing content in the document. Also, this prior solution typically handles only embedded images and fails to support other varieties of embedded content, such as embedded stylesheets, embedded web pages, embedded framesets, etc.

A second prior solution supports the automated selection of file names and locations of each embedded piece of content for a primary file, but again internally converts each content piece to linked content. For example, if a primary file containing three embedded pictures is saved in HTML format as "Web Page.htm", this prior solution can automatically select files names, such as Image1.gif, Image2.gif, Image3.gif, for the three pictures. Links are created for these images, which are stored as separate files on a storage mechanism, such as a hard disk drive. While this solution does not rely upon a dialog to prompt a user to select file names or storage locations in response to saving the primary file, the linked content fails to provide the expected behaviors for the original embedded content.

A third prior solution operates to save all content in an HTML-formatted document, both linked and embedded, in a special single file containing embedded files. Although this single file solution addresses some of the desired behaviors expected by users of embedded content, this solution also introduces unacceptable limitations because all content in the document is now treated as embedded content, even linked content. In other words, this single file solution satisfies selected user expectations for embedded content but violates all expectations for linked content. In addition, the single file is typically not formatted as an HTML document. This means that the file is not directly readable by browsers or editable by existing web page editors. Moreover, the single file is typically slower to save and slower to load than a similar HTML-formatted file, because of the inherent disadvantage of loading a large single file rather than progressively loading multiple files over a network connection.

In view of the foregoing, there is a need to fulfill users' expectations of how embedded content should work while also using HTML as the file format. The present invention solves this embedded content management problem for HTML-formatted files by placing information in a primary file that provides a cue to an editing program, such as a web page editor, that a particular file associated with that primary file should be treated as either embedded or linked content.

SUMMARY OF THE INVENTION

Although HyperText Markup Language ("HTML") files contain links to electronic files, rather than embedded files, the present invention can simulate the characteristics exhibited by an electronic document having one or more embedded files. For example, users of typical desktop productivity tools, such as word processing or spreadsheet programs, have the expectation that opening an electronic file containing an embedded file will result in the opening of that embedded file. For a corresponding HTML-formatted file, which can not contain an embedded file because of the inherent limitations of the HTML file format, the present invention achieves this desirable characteristic by saving a primary file having an embedded file to a storage mechanism, such as a hard disk drive, and saving each embedded file as a linked support file in a known location on the storage mechanism. In response to initiating a save operation for this primary file, a "file list" is created that references the primary file and each support file representing embedded content for the primary file. This file list is typically identified by an HTML tag placed in the header of the primary file. When the HTML file is opened during the next working session, an editor program module open a link to each support file identified by the file list by use of traditional HTML mechanisms. In this manner, the opening of the HTML-formatted primary document also results in the opening of each linked support file, thereby presenting the user with the impression that files embedded within the primary file have been opened.

Users of traditional desktop productivity tools also have the expectation that deleting an embedded file from a non-HTML document during edit operations will also result in the deletion of the embedded file from the storage mechanism. To achieve this desirable characteristic in a corresponding HTML-formatted file, the present invention can conduct an inquiry at save time to determine whether a prior file list is available for the primary file. This prior file list, which can be created during a previous save operation for the primary file, contains entries that identify each support file associated with the primary file at the time of the prior save operation. If this prior file list is available, the identifiers for the support files in the prior file list are compared to identifiers for any support files created during the current save operation. Support files may be created at the time of the current save operation if corresponding embedded content remain after edit operations on the primary file. Any support files that are identified by entries in the prior version of the file list, but not identified by entries in the current file list of support files, are deleted from the hard disk. In this manner, any support file saved during the previous save operation, but deleted by the user during current edit operations, will be deleted from the hard disk during the current save event. In other words, when the HTML-formatted primary file is saved again, the editor program module does not attempt to save the support file corresponding to an embedded file deleted by the user because this support file is no longer referenced by the primary file. Consequently, the present invention can complete a clean-up operation to delete from the hard disk files which were embedded in a prior version of the primary file, but are no longer referred by that primary file.

More particularly, the present invention is a computer-implemented process for simulating, in an HTML-formatted primary file, characteristics of an electronic document containing an embedded file. The process can be initiated in response to conducting a save operation for an electronic document intended to be saved as an HTML document. Continuing with the save of the document as an HTML file, the embedded file is written to a hard disk of the computer as a support file and automatically assigned a unique identifier, such as a file name, and a storage configuration. An automated naming system can be used to assign unique identifiers and storage configurations to embedded files in response to saving a primary file containing the embedded files, thereby avoiding possible file name collisions. A new file list is created and saved to disk in association with the support file. This new file list may reference both itself and the support file, and typically includes the unique identifier assigned to the support file. The file list, typically an XML file, can be used to track which content is embedded and which content is linked in a primary file saved in HTML format. This file list supports an automated process for cleaning-up embedded content that has been removed from the HTML-formatted primary file as a result of edit operations.

An inquiry is conducted to determine if a prior file list is associated with the primary document. If a prior file list is located by this search, then the new file list is compared to the prior file list to determine whether support files identified by the prior file list are not identified by the new file list. The support files not identified in the current file list, but identified in the prior file list, can be deleted from the hard disk because the corresponding embedded files have been deleted from the primary file during current edit operations.

The present invention offers advantages over the prior art for managing embedded content in an HTML-file environment. If the user deletes apparent embedded content in the authoring environment, the corresponding supporting file is also deleted from the storage mechanism. If the user changes apparent content in one copy of a document, this embedded file will not change in other copies of the document because a separate copy of this file, i.e., the corresponding supporting file, is maintained in a known storage location for each document. If the user saves a copy of a document with embedded content, a supporting file corresponding to the embedded file is created and maintained on the storage mechanism for future reference in connection with edit operations of the document copy. If the user saves a document over an existing document, the apparent embedded content of the existing document is cleaned-up by deleting the supporting files corresponding to that embedded content. Adding new embedded content to a document does not result in an overwrite of existing content, either in that document or in any other document. The present invention also can process types of embedded content other than images, while correctly handling linked content and using standard HTML that is readable by browsers and web page editors.

The various aspects of the present invention may be more clearly understood and appreciated from a review of the following detailed description of the disclosed embodiments and by reference to the appended drawings and claims.

DETAILED DESCRIPTION OF THE EXEMPLARY EMBODIMENTS

Figure 1:
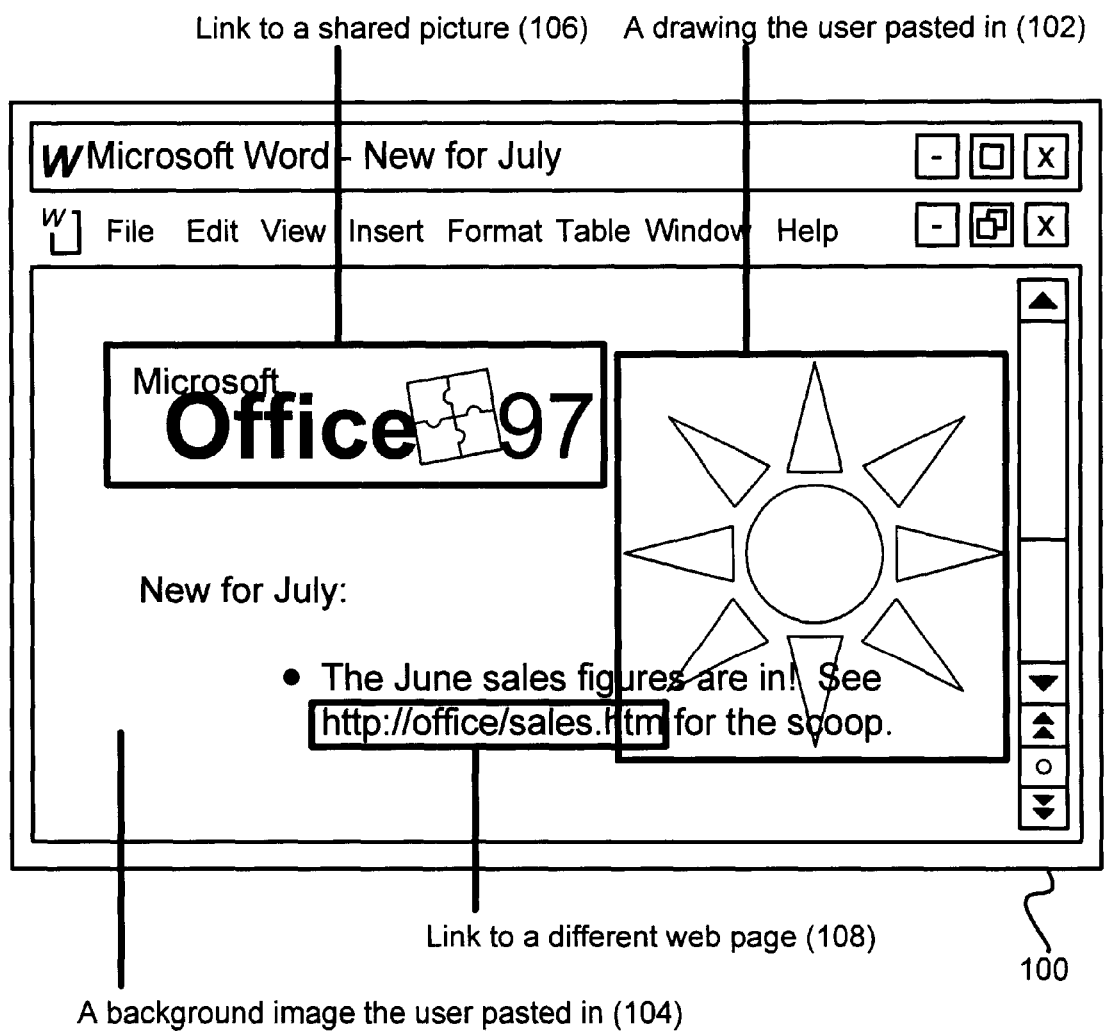
FIG. 1 is an illustration showing a representative display of an electronic document containing both embedded content and linked content.

Content in an Hyper Text Mark-up Language (HTML) formatted primary file is maintained as file(s), separate from the primary file itself, because of the inherent nature of HTML. In a physical sense, each piece of content is linked to the primary file, that is, it exists as a separate file on a storage mechanism, such as a hard disk, and the HTML primary file includes a reference to each separate file corresponding to this content. The present invention adds "clues" to the primary file to support a determination of which files should be treated as linked and which files should be treated as embedded. User-expected behaviors of embedded content can be simulated by the present invention as if the files were actually physically embedded in the main document.

Generally speaking, the present invention can be viewed as a computer-implemented process for simulating, in an HTML-formatted primary file, certain user-expected characteristics of an electronic document containing an embedded file. In response to initiating a save operation for a primary file to be saved as an HTML document, a file embedded within the primary file can be detected. In turn, a support file is created, for storage in a separate storage location that is physically removed from the primary file, to logically represent the embedded file. The creation of the support file is necessary because the HTML format does not allow a file to be physically embedded within the main electronic document, such as the primary file. In addition, a current file list, which is associated with the primary file, is created and saved to the storage mechanism, typically the hard disk drive for the computer. This new file list contains information identifying each support file associated with the primary file and references the primary file. In particular, this file list serves to identify support files that logically represent embedded content for an HTML-formatted primary file. The file list, which references the primary file and each support file, is typically identified by an HTML tag placed in the header of the primary file, such as an HTML <link> tag. The entries within the file list serve as cues that can be used by an editor program to track files that represent embedded content for the primary document.

In response to conducting a save operation for a primary file to be saved in HTML format, an inquiry can be conducted to determine if a prior file list is associated with the primary document. If a prior file list is located by this search, then the current file list, also described as a new file list, is compared to the prior file list. This comparison operation is completed to determine whether support files identified by the prior file list are no longer identified by the new file list. The support files not identified by the current file list, but identified in the prior file list, can be deleted from the hard disk of the computer because the corresponding embedded files have been deleted by edit operations for the primary file.

Identification of Embedded Content within an Electronic Document

For an exemplary embodiment, the creation of a support file, which logically represents embedded content within an HTML-formatted primary file, requires the identification of content embedded within the primary file prior to completion of the save operation. A determination of whether content of the primary file represents embedded content is preferably made on a case-by-case basis.

Certain supporting content files are never loaded by the underlying program module, but are instead generated in response to conducting a save operation. Examples include the forward and back buttons for a presentation prepared by Microsoft's "POWERPOINT" program, or the HTML file that simulates sheet tabs in Microsoft's "EXCEL" program. This type of content is preferably treated as embedded content.

Application programs typically use certain internal supporting files for communicating particular forms of data. For example, a file that keeps track of the header and footer for an electronic document is an internal supporting file. This type of content is preferably treated as embedded content.

A user-authored picture can be identified as embedded content if the picture is not represented by an <imagedata> tag in the corresponding VML image file. A user-authored hyperlink can be identified as embedded content if the link is maintained within the file list. A user-authored frame can be identified as embedded content if a CSS property "mso-embedded" for the <frame> tag is set to the true state. A user-authored sound or movie can be identified as embedded content if the source file is maintained in the file list. In general, files having entries in the file list, typically named "filelist.xml," are preferably treated as embedded content.

Creation of a Support File Representing Embedded Content

Upon identifying an embedded file associated with the primary file, a corresponding support file can be created for storage as a separate file on a storage mechanism, such as the hard disk drive for the computer. As part of this creation task, the support file is assigned both a unique identifier and a storage configuration, such as flat file or folder layout. Unique identifiers are desirable for file names of support files to avoid possible conflicts with other files associated with the primary file or with other documents maintained by the storage mechanism of the computer. Likewise, a proper file configuration for storing each support file on the storage mechanism is desirable to avoid overwriting another support file for the primary file or a separate document on the storage mechanism.

For some types of files, only one instance of the file can exist for a particular primary file. For example, in Microsoft's "POWERPOINT" program, a single GIF file represents the "next slide" button for each slide. For file types that have only one instance for a certain primary file, a unique identifier can be assigned to the corresponding file based on a fixed string of characters. For the referenced example of the GIF file for the "next slide" button in Microsoft's "POWERPOINT" program, the unique identifier "slide_next.gif" can be assigned to this file.

Multiple instances can exist for other types of files. In this case, a unique identifier can be created by combining a file name defined by a fixed string with a string of numbers, typically starting with the number 1 for the first instance. For example, if a primary file includes three different pictures, then the selected identifiers for these GIF-formatted images can be "image001.gif", "image002.gif", and "image003.gif".

After selecting a unique identifier for a file representing embedded content, a storage configuration can be selected for that file. Two possible configurations include "flat" and "folder" for file layout. In the flat case, a directory-type storage location can be created and identified by prepending the identifier of the primary file plus a "_". A representative example of this flat file format is shown in Table II, for a directory comprising a primary file identified as "Web Page" and a pair of files associated with this primary file, namely, "filelist.xml" and "image001.gif".

TABLE II

Web Page.htm
Web Page_filelist.xml
Web Page_image001.gif

For a folder layout, a folder can be created for embedded files by using the name of the primary file plus the localized term for "files". A representative example of this folder format is shown in Table III, for a primary file identified as "Web Page" and a pair of files associated with this primary file, namely, "filelist.xml" and "image001.gif".

TABLE III

Web Page.htm
Web Page files
image001.gif
filelist.xml

For the folder layout operation, each document has its own folder, thereby eliminating the possibility of a conflict of files having the same identifier within the same folder. Moreover, if files having the same string identifier, such as "Web Page," are placed in the same directory, then an extension can be added to the folder name to avoid collisions. For example, if a pair of files have the same string identifier "Web Page," then different extensions can be added to the folder name, such as folders "Web Page.htm" and "Web Page.html."

In this manner, an exemplary embodiment of the present invention can select unique identifiers for files to avoid file name conflicts and select storage locations for the files in a manner that avoids a conflict with embedded files in another document. Consequently, the exemplary embodiment can avoid accidentally overwrite existing embedded content in the current document or another document.

Creation of a File List that Identifies the Support Files

The file list, which references the primary file, can keep track of the embedded content in this main electronic document. For an exemplary embodiment, the file list is implemented as an XML file called "filelist.xml", and can include <o:File> tags and a <o:MainFile> tag. The <o:MainFile> tag has a single attribute ("o:HRef") that points to the primary file, referenced below as "Web Page."

<o:MainFile o:HRef="./Web Page.htm"/>

The <o:File> tag uses the same attribute to point to a given support file representing embedded content. Consequently, each support file associated with the primary file is identified by the file list and is linked to the primary file.

<o:File o:HRef="image001.gif"/>

Each "o:HRef" attribute is relative to the location of the "filelist.xml" for the document. The file list for a given primary file is referenced by an HTML tag, such as a <link> tag, in the header of the primary file. This provides a link between the primary file and the file list, which can be opened as a hyperlink.

The <o:File> tag also can include an optional attribute called "o:Version". This attribute defines the earliest version of an editor program module that can understand the file list. For example, if a new version of an editor can now support embedded stylesheets, the <o:File> entry for the stylesheet would look like:

<o:File o:HRef="stylesheet.css" o:Version="2.0"/>

If this optional attribute is omitted, an assumption is made that each version of an editor program can understand the file. This attribute also can be used to determine if a given support file representing embedded content is unknown, and needs special handling.

Operations of the File List for a Primary File

When the HTML-formatted primary file is opened in a work session, the editor accesses the HTML <link> tag for the file list associated with that primary file. In turn, the editor reads the file list, and opens a link to each support file identified by the file list. By opening the link to each support file referenced by the file list, a user is effectively presented with the expected behavior of opening files embedded within the primary file.

In response to conducting a save operation for a primary file to be saved in HTML format, a determination is made whether a prior file list is associated with the primary document. This prior file list is available for access by the editor if this list is referenced by an HTML tag in the primary file. The prior file list, if available, is typically created in response to a prior save operation for the primary file. If a prior file list is located by this search, then the current file list is compared to the prior file list to determine whether support files identified by the prior file list are not identified by the current file list. The support files not identified by entries in the current file list, but identified by entries in the prior file list, can be deleted from the hard disk because the corresponding embedded files have been deleted as a result of current edit operations on the primary file.

Referring now to the drawings, in which like numerals represent like elements throughout the several figures, aspects of the present invention and an exemplary operating environment will be described.

Operating Environment

Figure 2:
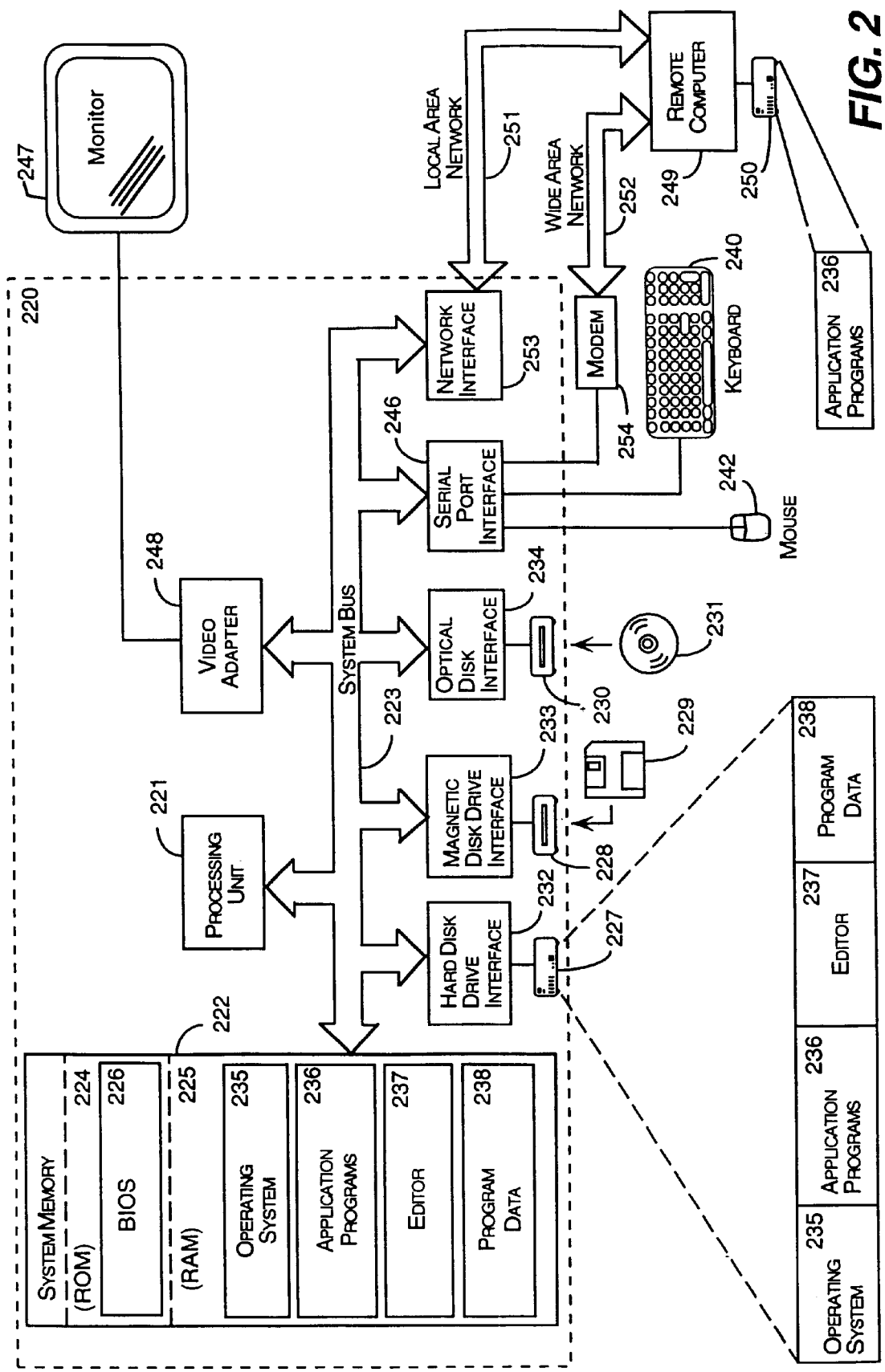
FIG. 2 is a block diagram illustrating the operating environment for an exemplary embodiment of the present invention.

FIG. 2 and the following discussion are intended to provide a brief, general description of a suitable computing environment in which the invention may be implemented. While the invention will be described in the general context of an application program that runs under an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a conventional personal computer 220, including a processing unit 221, a system memory 222, and a system bus 223 that couples the system memory to the processing unit 221. The system memory 222 includes read only memory (ROM) 224 and random access memory (RAM) 225. A basic input/output system 226 (BIOS), containing the basic routines that help to transfer information between elements within the personal computer 220, such as during start-up, is stored in ROM 224. The personal computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage for the personal computer 220. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 225, including an operating system 235 (e.g., Microsoft Corporation's "WINDOWS 95", "WINDOWS 98" or "WINDOWS NT" operating systems), one or more application programs 236, an editor 237, such as an HTML editor found in a browser program, and program data 238.

A user may enter commands and information into the personal computer 220 through a keyboard 240 and pointing device, such as a mouse 242. Other input devices (not shown) may include a microphone, joystick, game pad, satellite dish, scanner, or the like. These and other input devices are often connected to the processing unit 221 through a serial port interface 246 that is coupled to the system bus, but may be connected by other interfaces, such as a game port or a universal serial bus (USB). A monitor 247 or other type of display device is also connected to the system bus 223 via an interface, such as a video adapter 248. In addition to the monitor, personal computers typically include other peripheral output devices (not shown), such as speakers or printers.

The personal computer 220 may operate in a networked environment using logical connections to one or more remote computers, such as a remote computer 249. The remote computer 249 may be a server, a router, a peer device or other common network node, and typically includes many or all of the elements described relative to the personal computer 220, although only a memory storage device 250 has been illustrated in FIG. 2. The logical connections depicted in FIG. 2 include a local area network (LAN) 251 and a wide area network (WAN) 252. Such networking environments are commonplace in offices, enterprise-wide computer networks, intranets and the Internet.

When used in a LAN networking environment, the personal computer 220 is connected to the LAN 251 through a network interface 253. When used in a WAN networking environment, the personal computer 220 typically includes a modem 254 or other means for establishing communications over the WAN 252, such as the Internet. The modem 254, which may be internal or external, is connected to the system bus 223 via the serial port interface 246. In a networked environment, program modules depicted relative to the personal computer 220, or portions thereof, may be stored in the remote memory storage device. It will be appreciated that the network connections shown are exemplary and other means of establishing a communications link between the computers may be used.

Figure 3:
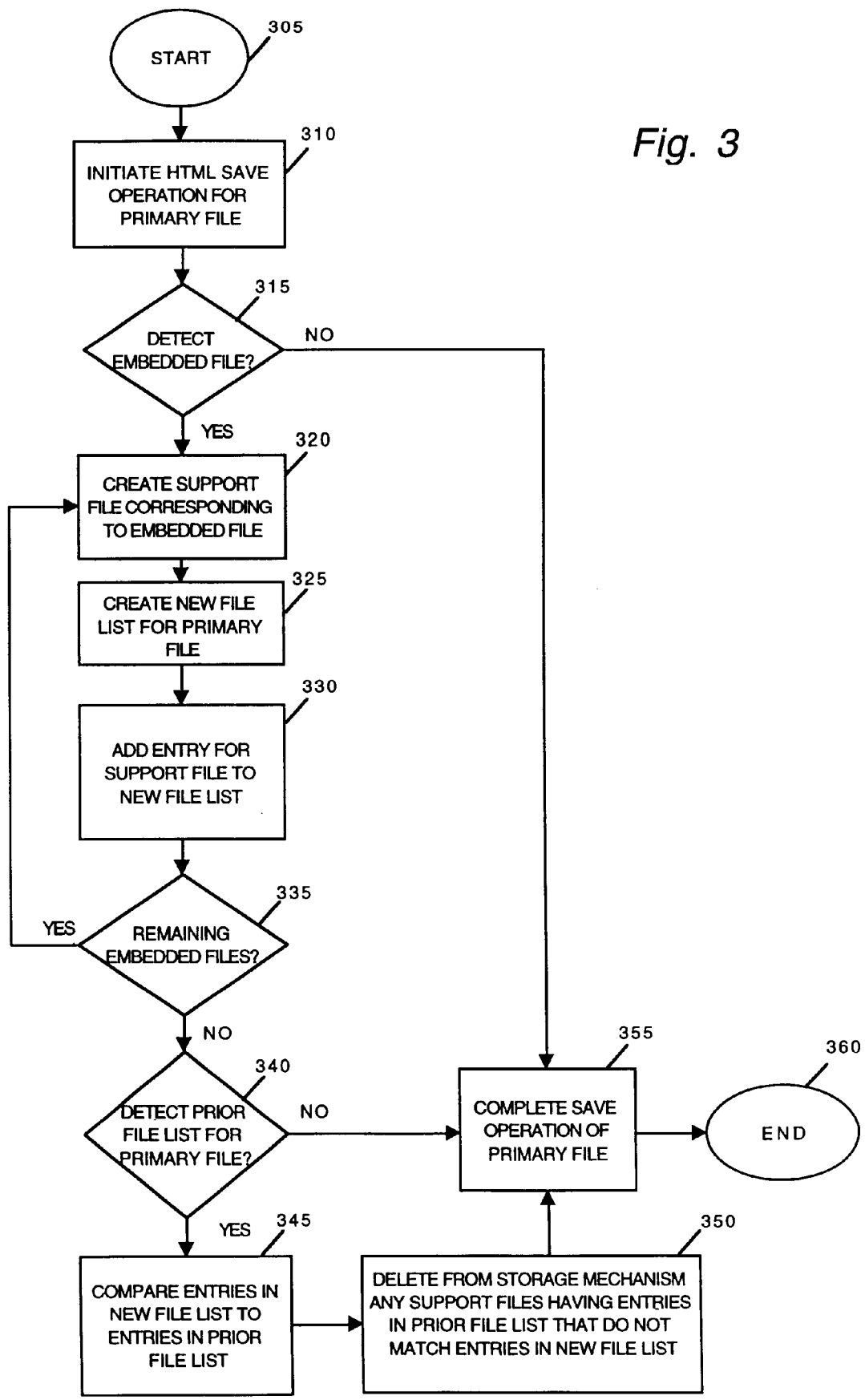
FIG. 3 is a logical flow chart diagram illustrating the steps of a computer-implemented method for simulating, in an HTML-formatted primary file, the expected characteristics of an electronic document containing an embedded file in accordance with an exemplary embodiment of the present invention.

FIG. 3 illustrates the exemplary steps for a computer-implemented process for simulating certain user-expected behaviors of an electronic file containing embedded content when that document is saved as an HTML-formatted primary file. The process 300 begins at the START step 305 and proceeds to step 310, in which a save operation is initiated to save an electronic document as an HTML-formatted primary file. In step 315, an inquiry is conducted to determine whether the primary file contains an embedded file. If the response to this inquiry is negative, the "NO" branch is followed to step 355. Otherwise, the "YES" branch is followed from step 315 to step 320 and a support file is created that logically corresponds to the embedded file. This support file is a file that is physically separate from its embedded file counterpart, but logically represents the content of the embedded file.

In step 325, a new file list is created to store an entry for each support file representing a file embedded within the main electronic document, namely the primary file. This new file list is associated with the primary file, and an HTML <link> tag is typically inserted within the header of the primary file to reference this file list. In step 330, an entry is added to the new file list to define identifying information for the newly created support file.

An inquiry is conducted in step 335 to determine whether the primary file contains additional embedded files. If so, the "YES" branch is followed from step 335 to step 320 to support the processing of a support file related to that remaining embedded file. Otherwise, the "NO" branch is followed from step 335 to step 340.

In step 340, an inquiry is conducted to determine whether a primary file contains a reference, such as an HTML <link> tag within its header, to a prior file list. A prior file list can be created during a previous save operation for the primary file and supports the identification of support files representing embedded content for the primary file at the time of that prior save operation. If a prior file is not detected in step 340, the "NO" branch is followed to step 355. Otherwise, the "YES" branch is followed from step 340 to step 345.

In step 345, each entry in the new file list is compared to the entries maintained in the prior file list. Specifically, identifiers for the support files referenced in the new file list are compared to the identifiers for the support files referenced by the prior file list. In the event that entries in the prior file list do not match entries in the new file list, the support files for these non-matching entries are deleted from the storage mechanism of the computer. In this manner, support files representing embedded content that have been deleted during edit operations arising prior to the current save operation can be deleted from the hard disk of the computer in step 350, thereby achieving the behavior expected by a user for deleted embedded content.

In step 355, the save operation is completed for the primary file. The process terminates at the END of step 360.

Figure 4:
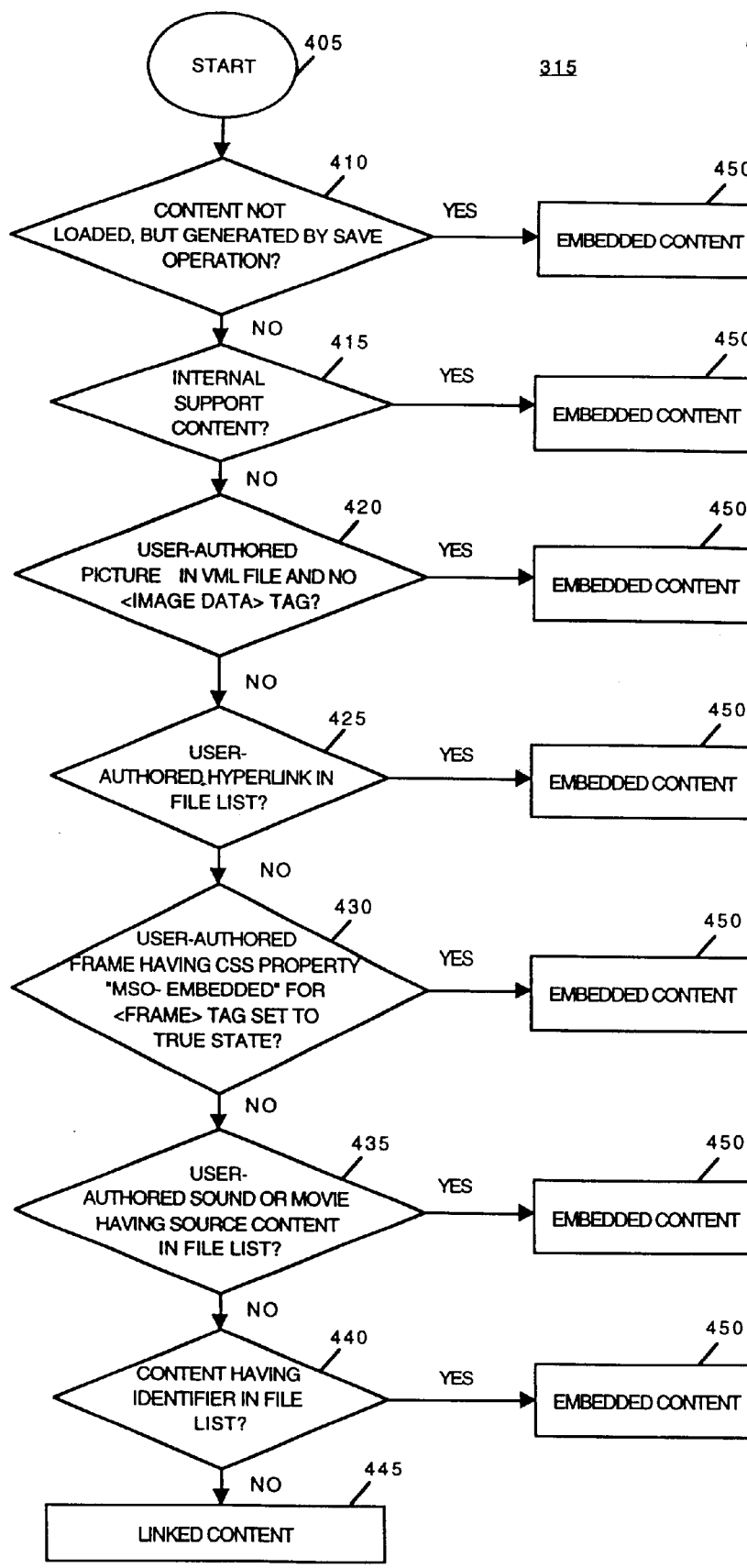
FIG. 4 is a logical flow chart diagram illustrating the steps for a process for detecting whether an electronic file represents embedded content or linked content in accordance with an exemplary embodiment of the present invention.

FIG. 4 provides a logical flow chart diagram that illustrates the steps completed to determine whether a particular file associated with the primary file represents embedded content or linked content. Turning now to FIG. 4, which provides an overview of the steps completed by task 315 of FIG. 3, the process begins at the START step 405 by obtaining a file associated with the primary file. In step 410, an inquiry is conducted to determine whether the content for this file is generated by a save operation rather than loaded at the time of loading the file. If so, the "YES" branch is followed to step 450 and the file is identified as representing embedded content. Otherwise, the "NO" branch is followed from step 410 to step 415.

In step 415, an inquiry is conducted to determine whether the file represents internal support content. If the response to this inquiry is positive, the file represents embedded content, as shown in step 450. Otherwise, the "NO" branch is followed from step 415 to step 420.

In step 420, an inquiry is conducted to determine whether the file is a user-authored picture in a VML file that has no <image data> tag. If so, the file represents embedded content, as shown in step 450. Otherwise, the "NO" branch is followed from step 420 to step 425.

In step 425, an inquiry is conducted to determine whether the file is a user-authored hyperlink maintained in the file list. If so, the file is identified as embedded content in step 450. Otherwise, the "NO" branch is followed from step 425 to step 430.

In step 430, an inquiry is conducted to determine whether the file is a user-authored frame having a CSS property "MSO-embedded" for a <frame> tag set to the true state. If so, the file is identified as embedded content in step 450. Otherwise, the "NO" branch is followed to step 435.

In step 435, an inquiry is conducted to determine if the file is a user-authored sound or a movie having source content in the file list. If so, the file is identified as embedded content in step 450. Otherwise, the "NO" branch is followed from step 435 to step 440.

In step 440, an inquiry is conducted to determine if the file has a corresponding identifier in the file list, such as the "filelist.xml". If so, the file is identified as embedded content in step 450. Otherwise, the "NO" branch is followed from step 440 to step 445 and the file is identified as linked content—not embedded content—for the primary file.

Figure 5:
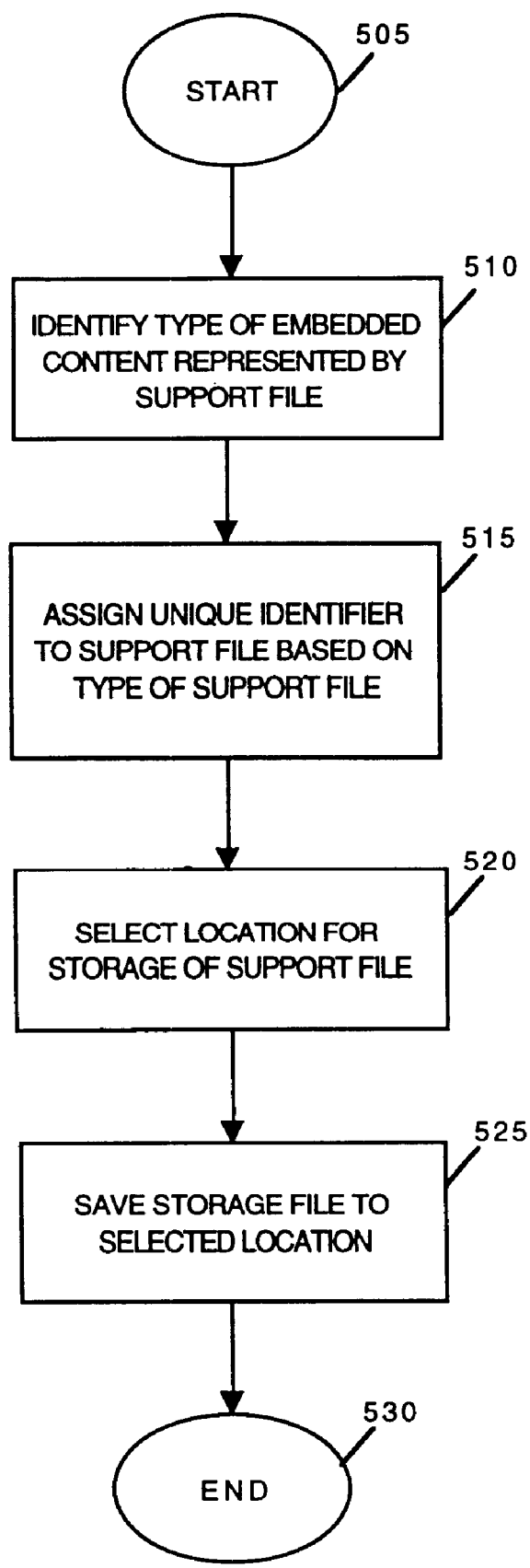
FIG. 5 is a logical flow chart diagram illustrating the steps of a process for creating a support file representing embedded content of a primary file in accordance with an exemplary embodiment of the present invention.

FIG. 5 is a logical flowchart diagram illustrating the exemplary steps for a computer-implemented process for creating a support file corresponding to a detected embedded file of a main electronic document, such as the primary file. For an exemplary embodiment, a central application program interface (API) can be accessed by an editor program, such as the editor 37 (FIG. 1), to create a support file for content identified as an embedded file. The editor can pass each identified embedded file through this API to avoid overwriting this content with a new file. In response to calling the API, the editor passes the type of support file to be created for the corresponding embedded content. Based on the file type, the API can assign a unique identifier, such as a file name, for this support file. In addition, the API can support the selection of a storage arrangement for the support file, including a flat file format or a folder layout.

Turning now to FIG. 5, which illustrates in more detail the steps completed during task 320 of FIG. 3, a computer-implemented process is initiated at the START 505 in response to detecting an embedded file of the primary file. In step 510, the type of embedded content is identified for the corresponding support file. As indicated above with respect to FIG. 4, the support file can represent a variety of file types, including pictures, hyperlinks, sounds, movies, and other well known file types. A unique identifier is assigned to the support file based on the identified type for the embedded content in step 515. The tasks completed in step 515 will be described in more detail below with respect to FIG. 6.

In step 520, a location on the storage mechanism, based on storage configuration, is selected for storage of the support file. Typical file storage arrangements include a flat configuration or a folder configuration. Significantly, the storage configuration is selected in a manner that avoids a conflict with a support file representing an embedded file of another document. In this manner, existing embedded content is not accidentally overwritten in the primary file or another electronic document in response to storing the support file on the storage mechanism. The tasks completed in step 520 are described in more detail below with respect to FIG. 7.

In step 525, the support file is saved to a selected location on the storage mechanism, such as a hard disk drive, in the selected file or folder configuration. The process 500 is terminated at the END step 530.

Figure 6:
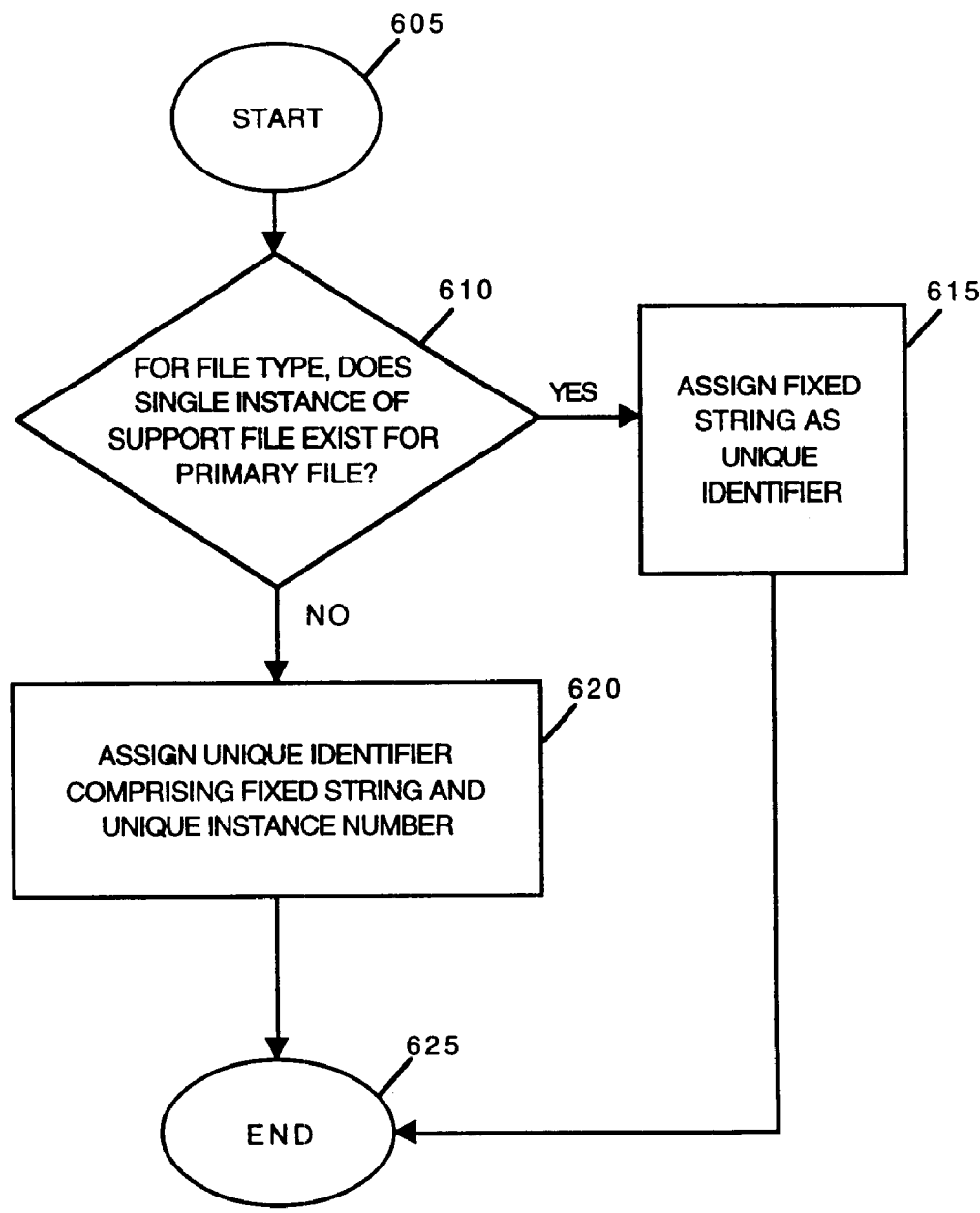
FIG. 6 is a logical flow chart diagram illustrating the steps for a process for assigning a unique identifier to a support file representing embedded content of a primary file in accordance with an exemplary embodiment of the present invention.
Figure 7:
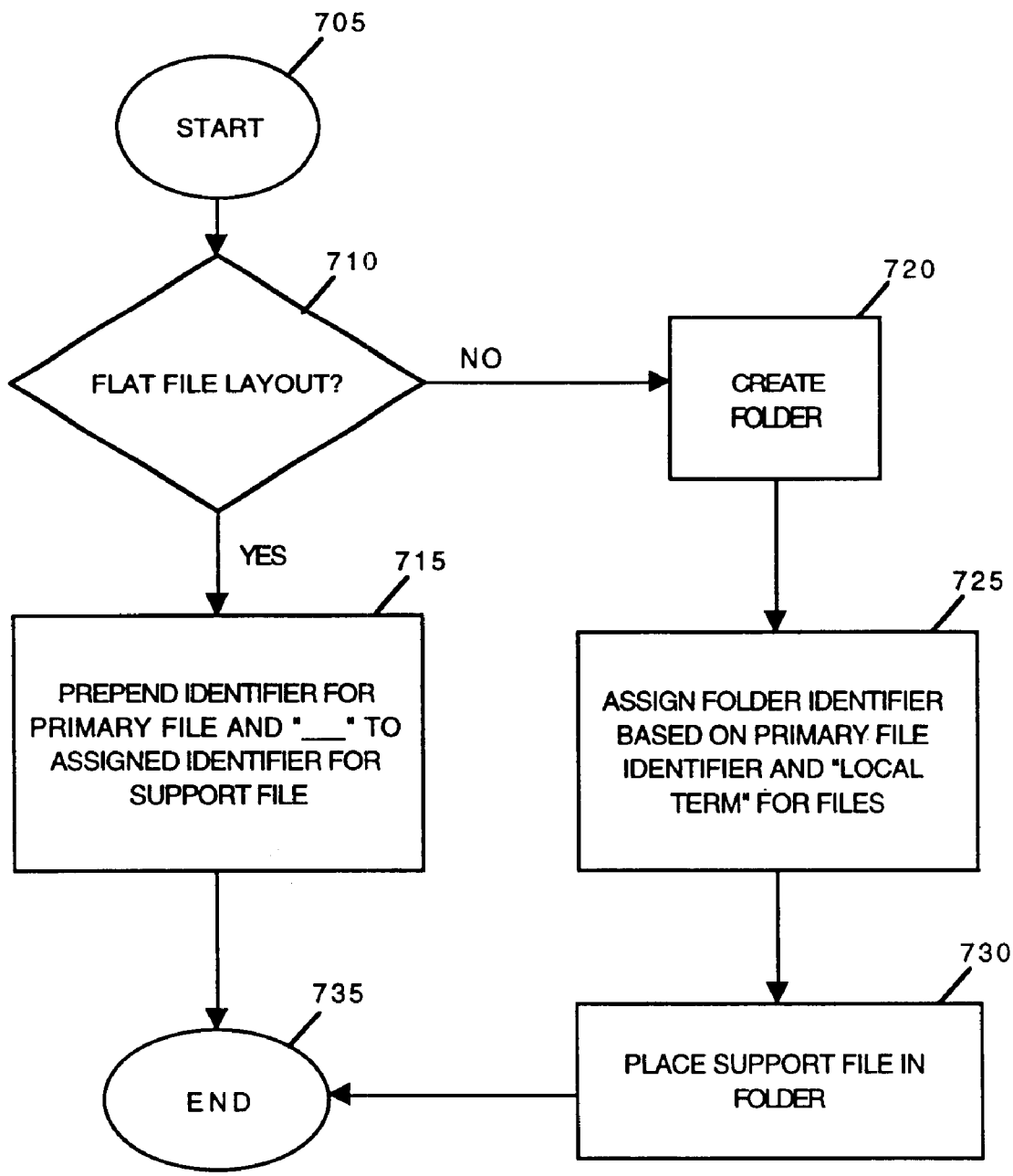
FIG. 7 is a logical flow chart diagram illustrating the steps for a process for selecting a storage location for a support file representing embedded content of a primary file in accordance with an exemplary embodiment of the present invention.

FIG. 6 is a flowchart diagram illustrating the exemplary steps for a process for assigning a unique identifier to a support file representing embedded content of a main electronic document. FIG. 7 is a logical flowchart diagram illustrating the exemplary steps of a process for selecting a storage configuration for the support file. FIG. 6 illustrates in detail the tasks completed in step 515 of FIG. 5, whereas FIG. 7 illustrates in detail the tasks completed in step 520 of FIG. 5.

Turning first to FIG. 6, the process begins at the START step 605 and proceeds to step 610. An inquiry is conducted in step 610 to determine, for the file type logically represented by the support file, whether a single instance of the support file exists for the main electronic document, namely the primary file. If so, the "YES" branch is followed from step 610 to step 615 and a fixed string is assigned as a unique identifier to this support file. The process then proceeds from step 615 to the END step 625.

In contrast, if the response to the inquiry is negative, the "NO" branch is followed from step 610 to step 620. A unique identifier is assigned in step 620 to the support file based on the combination of a fixed string and a unique instance number. For example, the first instance of the support file type can be identified by a fixed string and the instance number 001 (the number 1 preceded by a padding of one or more zeroes). The second instance of this support file type includes the identical fixed string and a different instance number, typically in numerical order, such as 002, and so forth for other instances of this support file type. The process then terminates at the END step 625.

Turning now to FIG. 7, the process for selecting a storage configuration for the support file is initiated at the START step 705. In step 710, an inquiry is conducted to determine whether the storage configuration is a flat file layout. If so, the "YES" branch is followed from step 710 to step 715. In step 715, the combination of an identifier for the primary file and "_" is prepended to the assigned identifier for the support file to define a directory location for this file. This defines the flat file configuration for the storage of this support file, and the support file is stored within this directory location. The process then terminates at the END step 735.

In the event that the response to the inquiry of step 710 is negative, the "NO" branch is followed to step 720, where a folder configuration is selected. In step 725, the folder created in step 720 is assigned a folder identifier based on the identifier for the primary file and a "local term" for files. For example, if the primary file identifier is "web page" for the main document, and the "local term" for files is the term "files", the folder identifier comprises "web page files". The support file is then placed in this identified folder on the storage mechanism in step 730. The process then terminates at the END step 735.

In summary, the present invention is a computer-implemented process for simulating, in an HTML-formatted primary file, certain user-expected characteristics of an electronic document containing an embedded file. In response to initiating a save operation for a primary file to be saved as an HTML document, a file embedded within the primary file is detected. In turn, a support file is created for storage, in a separate storage location and physically removed from the primary file, to logically represent the embedded file. In addition, a current file list, which is associated with the primary file, is created and saved to the storage mechanism, typically the hard disk drive for the computer. This new file list contains information identifying each support file associated with the primary file and references the primary file.

When the HTML-formatted primary file is opened in a work session, the editor can use a conventional HTML file opening mechanism to open a link to each support file representing apparent embedded content. In response to conducting a save operation for a primary file to be saved in HTML format, an inquiry can be conducted to determine if a prior file list is associated with the primary document. If a prior file list is located, then the current file list is compared to the prior file list. This comparison operation is completed to determine whether support files identified by the prior file list are no longer identified by the current file list. The support files not identified by the current file list, but identified in the prior file list, can be deleted from the hard disk of the computer because the corresponding embedded files have been deleted by edit operations for the primary file.

Those skilled in the art will appreciate that the present invention is not limited to HTML file formats, and that the inventive concepts can be extended to a single-file Web page format, such as MIME HTML.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the appended claims rather than the foregoing description defines the scope of the present invention.

What is claimed is:

1. A computer-readable medium having computer-executable instructions for simulating characteristics of an electronic document containing embedded content when the document is saved in a HyperText Markup Language (HTML) by performing the steps comprising:

initiating an HTML save operation of a primary file;

determining whether the primary file contains a file embedded within the primary file;

in the event that the primary file contains an embedded file, creating a support file representing the embedded file for storage as a separate file on a storage mechanism and assigning a unique identifier to the support file;

creating a new file list linked to the primary file, the new file list stored on the storage mechanism and comprising the identifier assigned to the support file;

determining whether a prior file list is associated with the primary document, the prior file list containing an identifier for a support file created during a prior save operation for the primary file;

in response to locating the prior file list, comparing the new file list to the prior file list, and if the identifier for the support file created during the prior save operation does not match another identifier in the new file list for the support file, deleting from the storage mechanism the support file having the identifier in the prior file list.

2. The computer-readable medium of claim 1, wherein the step of determining whether the primary file contains an embedded file comprises the steps of:

in the event that the primary file contains content that is generated by a save operation, rather than loaded in response to loading the primary file, then the content is identified as embedded within the primary file;

in the event that the primary file contains content that supports internal communication for the primary file, then the content is identified as embedded within the primary file;

in the event that the primary file contains content that is a user-authored picture in a VML file and having no <image data> tag, then the content is identified as embedded within the primary file;

in the event that the primary file contains a user-authored hyperlink identified in the new file list, then the content is identified as embedded within the primary file;

in the event that the primary file contains content that is a user-authored frame having a certain CSS property for a <frame> tag set to a true state, then the content is identified as embedded within the primary file; and in the event that the primary file contains content that is a user-authored sound or movie identified by the new file list, then the content is identified as embedded within the primary file;

otherwise, the content associated with the primary file is linked to the primary file.

3. The computer-readable medium of claim 1, wherein the step of creating the support file comprises:

identifying the type of content for the embedded file represented by the support file;

assigning the unique identifier to the support file based on the identified type of content for the embedded file;

selecting a storage configuration for the support file; and storing the support file on the storage mechanism in the selected storage configuration.

4. The computer-readable medium of claim 3, wherein the step of assigning a unique identifier to the support file comprises:

for the identified type of content for the embedded file represented by the support file, determining whether a single instance of the support file exists for the primary file;

in the event that a single instance of the support file exists for the primary file, then assigning a fixed string as the unique identifier for the support file;

otherwise, assigning a combination of a fixed string and a unique instance number as the unique identifier for the support file.

5. The computer-readable medium of claim 3, wherein the step of selecting a storage configuration for the support file comprises:

determining whether the storage configuration for the support file is a flat file layout;

if the storage configuration for the support file is a flat file layout, then creating a directory having a directory identifier defined by an identifier for the primary file prepended to the assigned identifier for the support file and storing the support file on the storage mechanism within the directory identified by the directory identifier, otherwise, creating a folder having a folder identifier defined by a combination of the identifier for the primary file and a local file term and storing the support file on the storage mechanism in the folder identified by the folder identifier.

6. The computer-readable medium of claim 1, wherein the new file list is stored on the storage mechanism as a file separate from the primary file and is linked to the primary file by a hyperlink.

7. The computer-readable medium of claim 6, wherein the new file list is referenced in the primary file by an HTML <link> tag.

8. The computer-readable medium of claim 1, wherein the identifier assigned to the support file and maintained within the new file list comprises a unique file name for the support file and a link between the primary file and the support file.

9. The computer-readable medium of claim 1 further comprising computer-executable instructions for performing the steps comprising:

in response to opening the primary file, opening each support file identified by the new file list, thereby presenting a user with the impression that content embedded within the primary file has been opened by opening the primary file.

10. A computer-implemented method for managing content embedded within a primary file in response to saving the primary file in HyperText Markup Language (HTML) format, comprising the steps of:

in response to initiating an HTML save operation of the primary file, saving the content of each file embedded within the primary file to a storage mechanism by creating a support file that is separate from the primary file;

creating a file list for the primary file that comprises an entry for each support file associated with the primary file, each file list entry identifying the support file and representing a link between the primary file and the support file, and saving the file list for use with subsequent operations involving the primary file.

11. The computer-implemented method of claim 10, further comprising the step of inserting into the primary file an HTML <link> tag comprising a reference to the file list, the HTML <link> tag providing a link between the primary file and the file list.

12. The computer-implemented method of claim 11, further comprising the steps of:

after completing the HTML save operation for the primary file, opening the primary file and reading the HTML <link> tag for the file list; and opening each support file identified by the file list, thereby presenting the user with the impression that content embedded within the primary file has been opened as a result of opening the primary file.

13. The computer-implemented method of claim 10, wherein the step of saving the content of each file embedded within the primary file to a storage mechanism by creating a support file comprises:

identifying the type of the content for the embedded file represented by the support file;

assigning a unique identifier to the support file based on the identified type of content for the embedded file;

selecting a storage configuration for the support file; and storing the support file on the storage mechanism in the selected storage configuration.

14. The computer-implemented method of claim 13 wherein the step of assigning a unique identifier to the support file comprises:

for the identified type of content for the embedded file represented by the support file, determining whether a single instance of the support file exists for the primary file;

in the event that a single instance of the support file exists for the primary file, then assigning a fixed string as the unique identifier for the support file;

otherwise, assigning a combination of a fixed string and a unique instance number as the unique identifier for the support file.

15. The computer-implemented method of claim 14, wherein the step of selecting a storage configuration for the support file comprises:

determining whether the storage configuration for the support file is a flat file layout;

if the storage configuration for the support file is a flat file layout, then creating a directory having a directory identifier defined by an identifier for the primary file prepended to the assigned identifier for the support file and storing the support file on the storage mechanism within the directory identified by the directory identifier, otherwise, creating a folder having a folder identifier defined by a combination of the identifier for the primary file and a local file term and storing the support file on the storage mechanism in the folder identified by the folder identifier.

16. A computer-implemented method for mananaging content embedded within a primary file in response to saving the primary file in HyperText Markup Language (HTML) format, comprising the steps of:

conducting an inquiry during a current save operation to determine whether a prior file list is available for the primary file, the prior file list identifying each support file stored as a separate file on a storage mechanism and representing content embedded within the primary file at the time of a prior save operation;

if the prior file list is available, comparing each support file identified in the prior file list to a current file list identifying each support file stored as a separate file on a storage mechanism and representing content embedded within the primary file at the time of the current save operation;

if the prior file list identifies a support file of a prior save operation that is not identified by the current file list, deleting from the storage mechanism the non-matching support file identified in the prior file list.

17. The computer-implemented method of claim 16 wherein the current file list and the prior file list are each stored on the storage mechanism as a file separate from the primary file and linked to the primary file by a hyperlink.

18. The computer-implemented method of claim 16, wherein for each support file identified by the current file list, the current file list comprises a unique file name for each support file and a link between the primary file and the support file.

19. The computer-implemented method of claim 16 further comprising:

in response to conducting an open file operation for the primary file after completing the current save operation, opening each support file identified by the current file list, thereby presenting a user with the impression that content embedded within the primary file has been opened by opening the primary file.

* * * * *